United States Patent
Sohn et al.

(10) Patent No.: US 7,984,430 B2
(45) Date of Patent: Jul. 19, 2011

(54) PARSER FRAMEWORK USING MARKUP LANGUAGE

(75) Inventors: Kang Min Sohn, Ansan (KR); Yun Kwang Hong, Daejeon (KR); Beom Ryeol Lee, Daejeon (KR); Kwang Ho Yang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1209 days.

(21) Appl. No.: 11/618,810

(22) Filed: Dec. 30, 2006

(65) Prior Publication Data

US 2008/0127066 A1    May 29, 2008

(51) Int. Cl.
*G06F 9/44*    (2006.01)
(52) U.S. Cl. ...................................................... 717/143
(58) Field of Classification Search .................. 717/139, 717/143
See application file for complete search history.

(56) References Cited

U.S. PATENT DOCUMENTS

| | | | |
|---|---|---|---|
| 2002/0015093 A1 | 2/2002 | Dureau et al. | |
| 2004/0237044 A1* | 11/2004 | Travieso et al. | 715/530 |
| 2005/0229105 A1* | 10/2005 | Novak et al. | 715/744 |
| 2007/0260571 A1* | 11/2007 | Mansfield et al. | 706/48 |

OTHER PUBLICATIONS

IEEE 100: The Autoritative Dictionary of IEEE Standard Terms, 7th Ed. (2000), pp. 46, 137, 181-182, 207-208, 683-684, 785, 874, and 1074-1075.*

Microsoft Computer Dicitonary (Haynes, S. Editor), 5th Ed. (2002), pp. 31, 79, 82-83, 106, 118, 120-121, 332-333, 392, 424, 489, and 491.*

Floridi, L., The Blackwell Guide to the Philosophy of Computing and Information (2004), Blackwell Publishing [retrieved from http://uwch-4.humanities.wasington.edu on Oct. 1, 2010].*

Mansfield, "How to Make a File Format Translator Using XML," XML 2002 Proceedings by deep X, 2002 <www.RenderX.com>, pp. 1-42.

* cited by examiner

*Primary Examiner* — Hyung S Sough
*Assistant Examiner* — Brian Wathen (57) ABSTRACT

Provided is an apparatus for a parser framework having the characteristics of the application program, using the markup language. But the apparatus for the parser framework, by providing a method of describing data format description and the data format parser framework that can applies the data format description to a development of application programs, has the advantage of reducing the amount of reprogramming involved in a conventional parser development, and maximizing reusability, finally increasing the efficiency of developing the application programs

15 Claims, 5 Drawing Sheets

FIG. 5

PARSER FRAMEWORK USING MARKUP LANGUAGE

BACKGROUND OF THE INVENTION

1. Field of the Invention

The present invention relates to an apparatus for a parser framework using a markup language, and more particularly, to an apparatus for a parser framework reusable in various application programs by universally describing various data formats with a markup language so as not to be dependent on a specific programming language.

2. Description of the Related Art

A parser is a software module that reads and interprets data files to convert the same into a form (i.e., data structure such as List, Tree or the like) processable in computer programs.

While using the same data format, one should develop a new parser each time or use a commercial or non-commercial form of the parser. Also, a library should be developed for each programming language.

A representative example of such a data file parser is a parser included in an image processing library, the parser dealing with various image data such as tga, jpg, bmp, etc, and internally including the parsers for each data format.

A framework means a reusable design, which is provided as a frame predefining a repeatedly performed work and filled with a needed portion thereof by a developer.

Representative examples of these frameworks include MFC (MICROSOFT® Foundation Class) that is a library for developing MS-window application programs, .NET Framework describing methods for developing web applications under internet environment and DirectX® for 3D programming.

On the other hand, the above-described parser has a problem in that parsers should be newly developed for a variety of data formats. For example, a parser for even the same file format such as tga and bmp should be newly developed for each project, which results in increase of cost and time for development.

Therefore, it is necessary to develop a parser reusable easily and requiring only development of newly needed parts. In other words, a parser comprising reusable and newly developed parts is needed. For this, a method for reusing a definition part of format irrespective of the language is also needed. This means a use of flat form/language-independent markup language.

SUMMARY OF THE INVENTION

Accordingly, the present invention is directed to an apparatus for a parser framework using markup language, which substantially obviates one or more problems due to limitations and disadvantages of the related art.

It is an object of the present invention to provide an apparatus for a parser framework using markup language and reusable in various application programs irrespective of the language by describing a method for interpreting various data formats with the markup language.

It is another object of the present invention to provide an apparatus for a parser framework, which can perform data interpretation by a minimal programming through an apparatus for a parser framework predefining repeated works for a data programming.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an apparatus for a parser framework, comprising: a universal parser module having a data format description written about a method of parsing a data file in the markup language, the universal parser module interpreting the data file through the data format description; and a callback function module delivering into an application program, a result obtained by partially parsing the data file according to the data format description.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
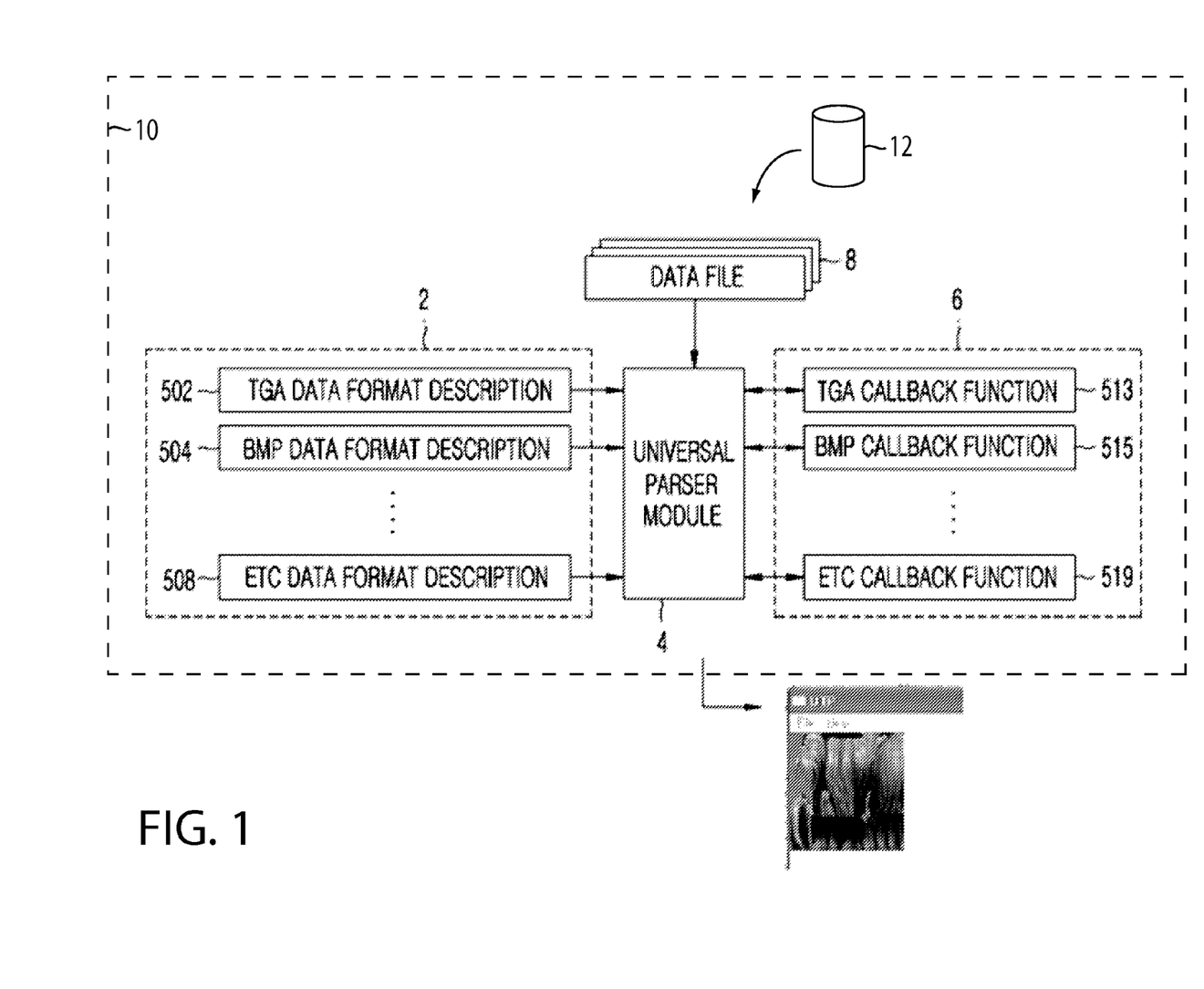
FIG. 1 is a schematic diagram illustrating an apparatus for a parser framework using markup language according to an embodiment of the present invention.

FIG. 1 is a schematic diagram illustrating an apparatus for a parser framework using a markup language according to an embodiment of the present invention.

Referring to FIG. 1, a universal parser module 4 includes a data format description module 2 describing a data format of TGA, BMP etc., thereby interpreting data file 8 (TGA file in this drawing)

Input data file 8 is partially interpreted according to a data format description module 2 and transmitted to callback function module 6 (TGA callback function module 513 in this drawings). In the callback function module 6, the data file 8 is converted into a form that can be used in an application program. When all of interpretations are ended, the data file 8 is converted into inner data structure of the application program to be usable for the specific purpose (displaying the image file on the screen in this drawing). FIG. 1 shows the data format description module 2, the callback function module 6, the universal parser module 4 and the data file 8 as part of a host computer system 10. As is well known in the art, the host computer system 10 includes a non-transitory computer-readable medium 12 having embodied thereon computer code configured to convert the data file, describe the format, and run the application program.

Figure 2:
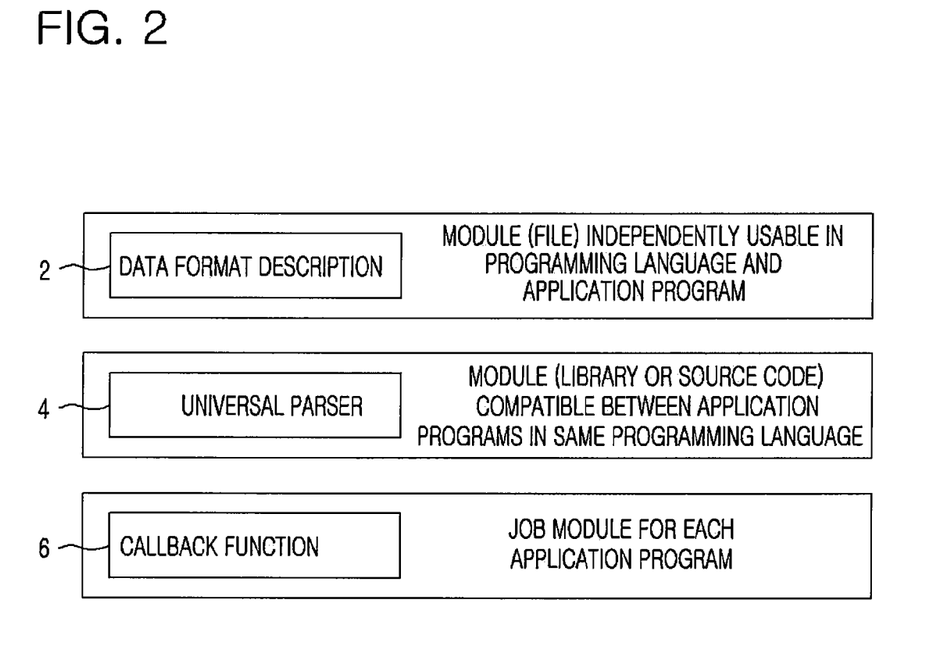
FIG. 2 is a diagram showing a sharing range and a processing procedure at each module so as to describe a data format using markup language according to an embodiment of the present invention.
Figure 5:
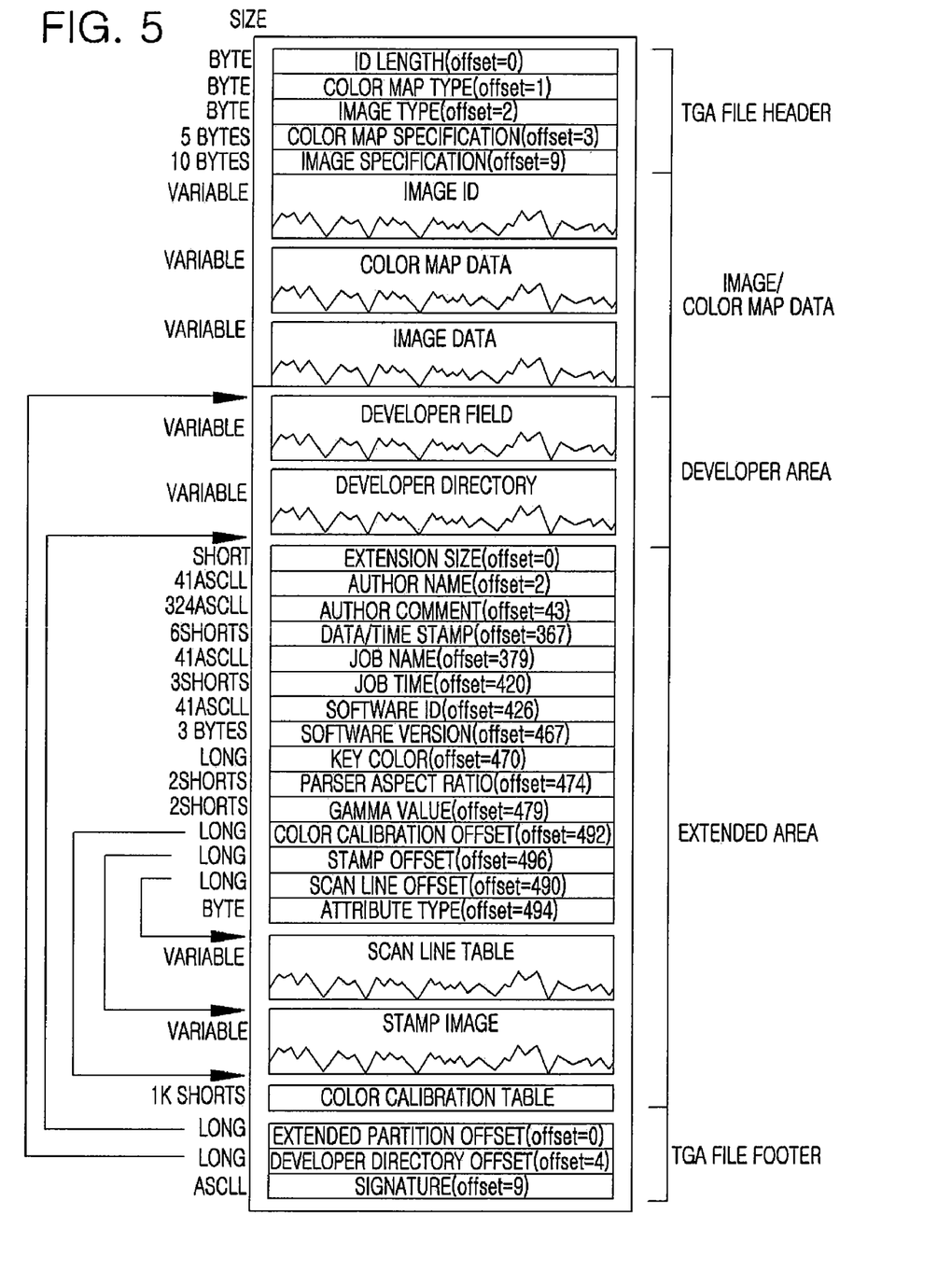
FIG. 5 is a structure diagram showing structure of a TGA file format used in an embodiment of the present invention.

FIG. 2 is a diagram showing a sharing range and a processing procedure at each module so as to describe data formats with markup language according to an embodiment of the present invention, and FIG. 5 is a structure diagram showing a structure of a TGA file format used in an embodiment of the present invention.

First referring to FIG. 2, the present invention includes 3 types of modules roughly. Each module includes a data format description module 2 using a markup language, a universal parser module 4 and a callback function module 6 of application programs.

Each module will now be explained below in detail.

Once a data format description module 2 is first made, it can be shared without regard to programming languages or application programs.

The data format description module 2 will now be more fully described.

(1) Data Format Description Module

The data format description module 2 is a document described with a markup language and provided as a file format of the markup language. An interpretation of input data is based on contents of the data format description module 2.

The data format description module 2 includes a format identifier, a field reader, a field verifier, a variant, a candidate, a loop, a sub-block, a sub-routine and an evaluation as grammatical compositions, which will be explained as follows.

First, it is preferable that the format identifier has a name recognizable easily at one instance as an identifier showing a format of written data. Also, it may include a file extension.

Example: <_format name="bmp" suffix=".bmp">

The field reader reads a desired number of bytes from the data file 8, and explicates the number of bytes of a field to be read. An example where the field reader is used is as follows.

Example: <read name="bitmap_size" desc="bitmap file size by a byte unit" count="4"/>

The field verifier reads a desired number of bytes from the data file 8, and checks whether it corresponds to that of an assigned item. On correspondence between the two, it keeps parsing. Otherwise it stops parsing. An example of using the field identifier is shown below.

<_verify name="bitmap_type" desc="bitmap identifier" count="2" value="BM" error="Not bitmap file">

In case that any item among the various items needs to be performed selectively according to the conditions, the variant designates the item as a variant item block. A candidate block is located between the variant items.

When meeting the specific conditions, a candidate designates a work block to be performed and explicates the condition and matching value satisfying the conditions. An example of using the candidate is shown below Example: <_candidate name "CHECK_MAT" desc=" parsing MATERIAL block" condition=":checker" value="0x0054414D">

A loop designates work block for repeating the same work. Also, a cycle is designated at EOF (End Of File) or as a number or a variant. An example of using the candidate is shown below Example: <_loop name="texture_read" desc="a loop reading texture" cycle=":texture_number">

A sub-block is used for designating a specific work as one work block. Also, it is used for internal identification. An example for using the sub-block is shown below.

Example: <_sub_block name="MESH_COMMON" desc="mesh/child mesh common block">

A sub-routine provides a function to perform a work defined in the data format description module 2. An example of using the sub-routine is shown below.

Example: <_sub_routine name="child_mesh_sub" desc="CHECK_MESH sub-routine for reading child mesh" target="MESH_COMMON"/>

An evaluation is used for requiring the result of a specific operation in the data format description module 2. An example of using the evaluation is shown below.

<_evaluation expression=":colormap_entry_size_in_bytes=:colormap_entry_size/8"/>

An embodiment of the data format description module 2 comprising elements of the grammar for format description as above and using the markup language will be as below. On the other hand, the markup language is XML. Also, TGA File Format shown at FIG. 5 is used in this embodiment.

<an embodiment according to the present invention>
<?xml version="1.0" encoding="euc-kr"?>
->shows a xml document
<_format name="tga" suffix=".tga">
shows tga format description document. A file extension is '.tga'
<!- -targa header-- >
shows starting part of a header of TGA file as comments in xml form.
<_read name="targa_id_length" desc="a length of Image ID Field (commonly 0)" coutt="1"/>
is a field showing a length of Image ID field and performs reading by 1 byte.
<_read name="targa_color_map_type" desc="checking whether a color map data exists, where 0 signifies palette not used and 1 signifies palette used" count="1"/>
is a field showing whether the color map data exists and performs reading by 1 byte.
<_read name="targa_image_type" desc="type of image (0-no image, 1-non compressed index, 2-RGB, 3-Grey, 9-RLE Index, 10-RLE, 11-RLE gray" unit="1"/>
is a field showing whether the color map data exists and performs reading by 1 byte.
<!- -colormap-- >
shows starting of a color map field.
<_read name="colormap_start" desc="palette start index" count="2"/>
is a field showing starting index of color map and performs reading by 2 bytes.
<_read name="colormap_length" desc="size of palette" count="2"/>
is a field showing the size of color map and performs reading by 2 bytes.
<_read name="colormap_entry_size" desc="type of palette (15,16,24,32)" count="1"/>
is a field showing the type of color map and performs reading by 1 byte.
<!- -image spec-- >
shows starting of a image spec field.
<_read name="tga_image_xstart" desc="x-axis origin of a image" count="2"/>
is a field showing the x-axis origin coordinate of image and performs reading by 2 bytes.
<read name="tga_image_ystart" desc="y-axis origin of a image" count="2"/>
is a field showing the y-axis origin coordinate of image and performs reading by 2.
<_read name="tga_image_width" desc="horizontal size of bitmap" unit="2"/>
is a field showing the horizontal size of image and performs reading by 2 bytes.

<_read name=" tga_image_height" desc=" vertical size of palette" unit="2"/> is a field showing the vertical size of image and performs reading by 2 bytes.

<_read name="tga_image_bpp" desc="bit per pixel-8,16, 24,32" unit="1"/> is a field showing bit per pixel and performs reading by 1 byte.

<_read name=" tga_image_descriptor" desc="oovhaaaa form as a image descriptor(oo=unused vh=flip bit aaaaa=alpha channel)" unit="1"/> is a field showing characteristics of a image and performs reading by 1 byte.

<!- -image id-- > shows starting of an image id field.

<_read name="image_id" desc="carrying an additional data about the image. A length is stored at targa_id_length to the extent of a maximum of 255 bytes and 0 signifies absence" count=":targa_id_length"/> is a field storing the additional data about the image to the extent of 255 bytes. Bytes to be read are stored at targa_id_length.

<!- -color map data-- > shows starting of color map data field

<_sub_block name="read_colormap" desc="sub-block for reading color map, operating when targa_color_map_type!=0 condition=":targa_color_map_type"> is a sub-block for reading the color map. It should not be 0. Also, conditions are stored at the targa_color_map_type.

<_evaluation expression=":colormap_entry_size_in_bytes=:colormap_entry_size/8"/> performs calculating a value of unit forming the colormap by byte.

<_read name="colormap" desc="data on colormap (palette), being null when targa_color_map_type=0 unit":colormap_entry_size_in_bytes" count=":colormap_length"/> is a field reading colormap_entry_size_in_bytes*colormap_length bytes.

</_sub_block> is a field signifying the end of the sub-block for reading colormap.

<!- -pixel-- > signifies starting of field where a pixel value is.

<_evaluation expression=":image_size=(:tga_image_width—:tga_image_xstart)*(tga_image_height—:tga_image_ystart)*:tga_image_bpp/8"/> performs an operation for a value of image size

<_read name="tga_pixel" desc="determining a method for parsing into tga image block after checking a targa_image_type unit="1" count=":image_size"/> is a field reading pixel value of image_size bytes.

</_format> signifies the end of tga format description document.

On the other hand, the universal parser module 4 shown in FIG. 2 is dependent on a programming language but independent of a data format. Also, the universal parser module 4 is provided in the form of source code or a library and modified only when a method for describing in the data format description module 2 is modified. The universal parser module 4 will be described below in further detail.

(2) Universal Parser Module

At the very first, the universal parser module 4 is an instrument for parsing a data format description module 2 written in a markup language. When depending on the grammar of the data format description module 2, the universal parser module 4 works without regard to a type of data file 8. In other words, the universal parser module 4 is independent of a data file format.

The universal parser module 4 parses the data format description module 2 by the markup.

(3) Callback Function Module of Application Program

The callback function module 6 of the application program is an interface provided for repeated jobs in the apparatus for the parser framework and is a part that should be made out for each application program by a developer.

Meanwhile, the callback function module 6 delivers a parsing result by the universal parser module 4 to a user.

Figure 3:
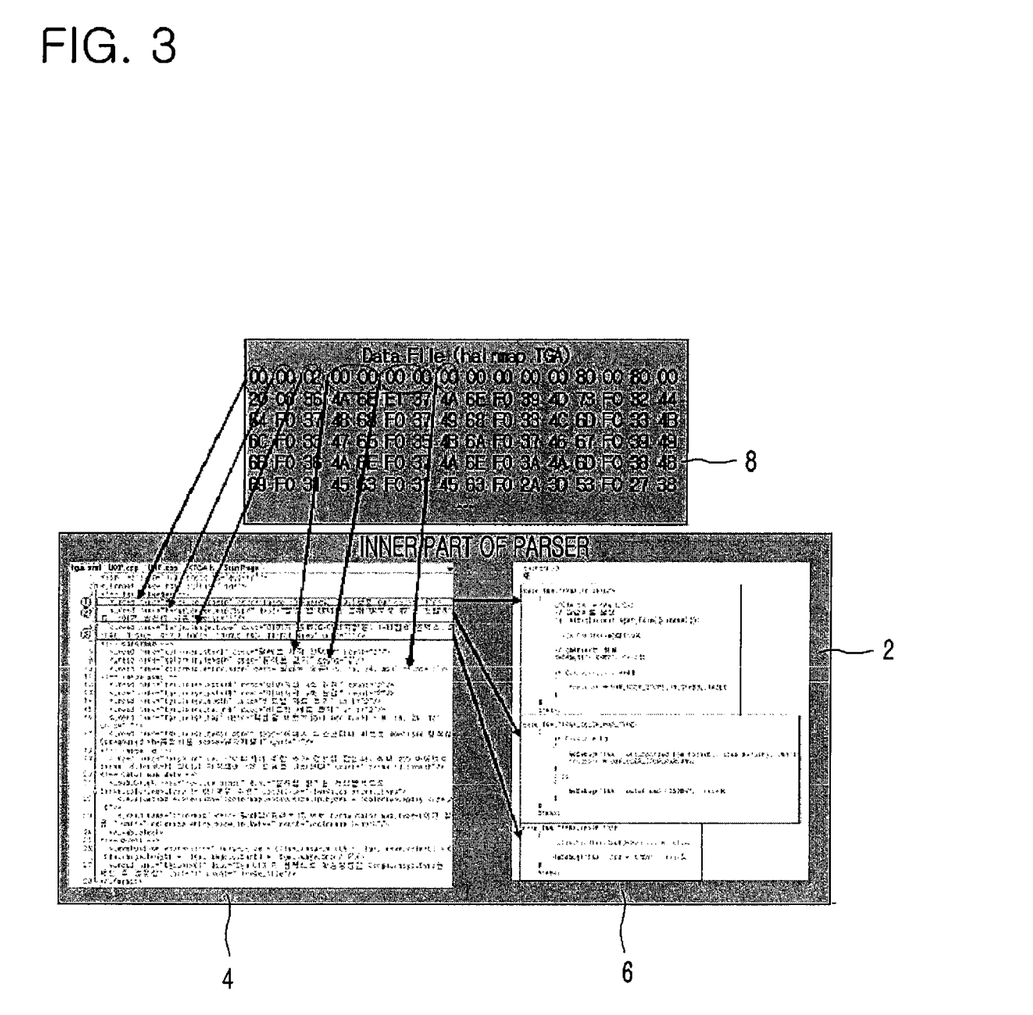
FIG. 3 is a view illustrating correlation of a data format description, a data file and a callback function according to an embodiment of the present invention.

FIG. 3 is a view illustrating correlation of a data format description, a data file and a callback function according to an embodiment of the present invention.

Referring to FIG. 3, the universal parser module 4 interprets contents of the data format description module 2 preloaded therein in order, whereby it reads data file 8 in parts. Then, the data file 8 read in the universal parser module 4 is delivered to the callback function module 6 so that the data file 8 can be converted into data structure usable in the application programs.

FIG. 3 shows a parsing process restructuring an image file from .tga format to tga data structure usable in the application programs. The universal parser module 4 based on data format description module 2 preloaded in it reads bytes defined by data format description module 2 from a external data file (.tga) 8, and deliver it to callback function module 6.

Data delivered to the callback function module 6 is stored as a data form usable in the application programs. When all of the parsing ends, the external data file 8 will be stored as a data structure in the application programs.

Figure 4:
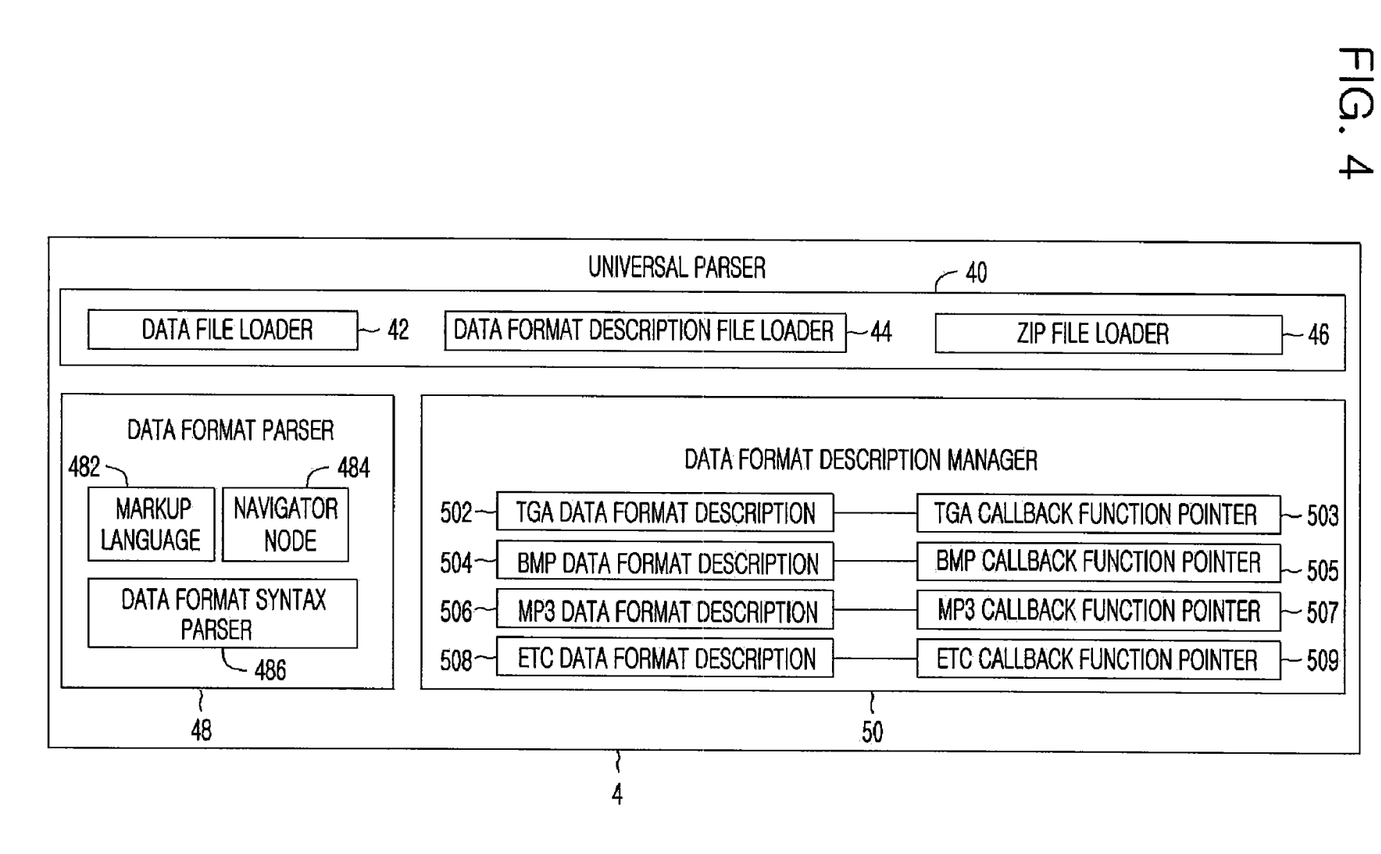
FIG. 4 is a structure diagram of an apparatus for a parser framework according to an embodiment of the present invention.

FIG. 4 is a structure diagram of an apparatus for a parser framework according to an embodiment of the present invention.

Referring to FIG. 4, the apparatus for the parser framework includes a file loader 40 reading a data file 8 etc., a data format parser 48 interpreting the data format description module 2 and a data format description manager 50 that manages the data format description module 2 and callback function module 6 of the corresponding data format and includes the data format description module 2.

A framework of the above universal parser module 4 includes module below.

1) File Loader

The file loader includes a data file loader 42, a data format description file loader 44 and a ZIP file loader 45.

First of all, the data file loader 42 is a sub-module calling files such a tga, bmp for parsing into the data format parser 48.

Data format description file loader 44 reads the data format description module 2. Data format description manager 50 manages a file from the data format description together with a callback function pointer (503, 505, 507, 509).

The ZIP file loader 46 is an additional element of parser framework as a module reading compressed file of Zip format.

2) Data Format Parser

The data format parser 48 includes a markup language parser 482, a node navigator 484 and a data format syntax parser 486.

First of all, the markup language parser 482 is a module parsing markup language file used in the data format description module 2.

On the other hand, variants, candidates, loops, sub-blocks and sub-routines in the data format description module 2 are defined as one of nodes. Also, a node navigator 484 controls the order of interpreting the node inside of data format description documents. For example, the node navigator 484 selects suitable candidates in the variant or performs loop analysis according to the number of repetition of the loop.

The data format syntax parser 486 is a module analyzing a data format syntax, dividing a syntax selected in the node navigator 484 into items through the markup language parser 482 and calling the corresponding callback function module 6 through each callback function pointer (503, 505, 507, 509) for a post-process fitting the pertinent item.

3) Data Format Description Manager

The data format description manager 50, as described above, has a plurality of the data format description modules 2 and the callback function pointers (503, 505, 507, 509) corresponding to a file standards dealing with a plurality of file formats. When the data format description module 2 loaded by the data format description file loader 44 and the callback function pointer (503, 505, 507, 509) are inputted into the data format description manager 50 that stores and manages a pair of them, the data format description manager 50 deliver the suitable data format description module 2 to the data format parser 48 by properly analyzing external file extension or header.

According to the present invention, it is possible to use the data format description module 2 again without regard to types of development languages and application programs by adopting the data format description module 2. Once the data format parser is programmed according to a development language, it is reusable without regard to application programs. When an additional parsing of a data format is desired, the present invention has the advantage of parsing a data format without an additional development of a new parser.

Also, the data format description module 2, using the characteristics of metadata that documents written in markup language have, can be easily reprocessed and used in generating specification documents of data format automatically according to reprocessing methods.

Consequently, the apparatus for the parser framework, by providing a method of describing data format description and the data format parser framework that can applies the data format description to a development of application programs, has the advantage of reducing the amount of reprogramming involved in a conventional parser development, and maximizing reusability, finally increasing the efficiency of developing the application programs.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus for a parser framework using a markup language, the apparatus for the parser framework including one or more memories, the one or more memories comprising:

a universal parser module configured to store a data format description that describes how to parse a data file using the markup language and parse the data file using the data format description; and a callback function module configured to deliver into an application program a result obtained by parsing the data file according to the data format description, wherein the data format description comprises:

a format identifier representing a format of written data;

a field reader reading a desired number of bytes from the data file and explicating the number of the bytes;

a field verifier comparing the bytes with a designated item, performing the parsing when the bytes coincide with the designated item as a result of the comparison, and stopping the parsing when the bytes do not coincide with the designated item as a result of the comparison;

a variant designating the item as a variant item block when any item among various items needs to be performed selectively according to conditions;

a candidate, when a specific condition is achieved, designating a work block to be performed and explicating a condition value and a result value satisfying the specific condition;

a loop designating a work block for repeating the same work and designating the frequency of repetition as EOF (End Of File), a number or a variable;

a sub-block used for internal identification when designating a specific work as one of work blocks;

a sub-routine providing a function to perform a work defined in the data format description at present location; and an evaluation used for acquiring a result value of a specific operation in the data format description.

2. The apparatus for the parser framework of claim 1, wherein the universal parser module reads bytes from the data file, the number of the bytes being explicated in the data format description, and delivers the bytes to the callback function module.

3. The apparatus for the parser framework of claim 1, wherein the universal parser module comprises:

a file loader configured to read the data file and the data format description;

a data format parser configured to interpret the data format description; and a data format description manager configured to deliver the data format description to the data format parser by properly analyzing an extension or header of the data file.

4. The apparatus for the parser framework of claim 3, wherein the file loader comprises:

a data file loader configured to call the data file into the data format parser;

a data format description file loader configured to read the data format description; and a ZIP file loader configured to receive a compressed file.

5. The apparatus for the parser framework of claim 3 or 4, wherein the data format description manager and a callback function pointer manage the data format description file read by the data format description file loader.

6. The apparatus for the parser framework of claim 3, wherein the data format parser comprises:

a markup language parser configured to parse a markup language file used in the data format description;

configured to analyze a data mat format syntax, and call a corresponding callback function through each callback function pointer for post-processing a syntax divided into items by the markup language parser; and a node navigator configured to control an order of interpreting nodes in the data format description.

7. The apparatus for the parser framework of claim 3, wherein the data format description manager comprises callback function pointers corresponding to the data format description.

8. The apparatus for the parser framework of claim 1, wherein the parsing result delivered to the callback function module is stored in a data form usable in the application program, and the data file is stored as one of data structures in the application program when the parsing ends.

9. The apparatus for the parser framework of claim 1, wherein the universal parser module is provided in a source code or a library form and independent of a data format of the data file.

10. The apparatus for the parser framework of claim 1, wherein the data format description defines each of the variant, the candidate, the loop, the sub-block and the sub-routine as a node.

11. The apparatus for the parser framework of claim 1, wherein the candidate is located between variants.

12. An apparatus for a parser framework using a markup language, the parser framework stored in a computer-readable medium, the computer-readable medium comprising:
   code for interpreting a data format description that describes how to parse a data file using the markup language;
   code for parsing a data file according to the interpreted data format description; and
   code for delivering a result obtained by parsing the data file to an application program,
   wherein the data format description comprises:
      a format identifier representing a format of written data;
      a field reader reading a desired number of bytes from the data file and explicating the number of the bytes;
      a field verifier comparing the bytes with a designated item, performing the parsing when the bytes coincide with the designated item as a result of the comparison, and stopping the parsing when the bytes do not coincide with the designated item as a result of the comparison;
      a variant designating the item as a variant item block when any item among various items needs to be performed selectively according to conditions;
      a candidate, when a specific condition is achieved, designating a work block to be performed and explicating a condition value and a result value satisfying the specific condition;
      a loop designating a work block for repeating the same work and designating the frequency of repetition as EOF (End Of File), a number or a variable;
      a sub-block used for internal identification when designating a specific work as one of work blocks;
      a sub-routine providing a function to perform a work defined in the data format description at present location; and
   an evaluation used for acquiring a result value of a specific operation in the data format description.

13. The apparatus for a parser framework of claim 12, wherein the code for parsing of the data file comprises:
   code for reading bytes whose number is indicated in the data format descriptions from the data file and delivering the read bytes to a callback function module on a basis of the interpreted data format description;
   code for storing the bytes delivered to the callback function module in a data form suitable for a data structure used inside the application program; and
   code for storing the parsed data file as the data structure in the application program when the parsing of the data file is completed.

14. The apparatus for a parser framework of claim 12, wherein a universal parser module used to parse the data file is provided in a form of a source code or a library and provided independent of a data format of the data file.

15. The apparatus for a parser framework of claim 12, wherein the data format description defines each of the variant, the candidate, the loop, the sub-block and the sub-routine as a node.

* * * * *